Figure 1:
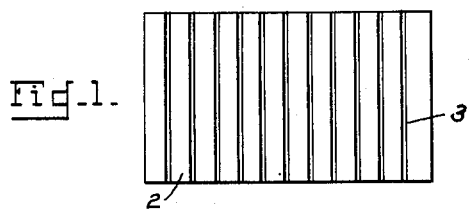

Feb. 13, 1945.  A. E. BENSON  2,369,130

REINFORCED RUBBER TREAD FOR TRACK SHOES

Filed March 3, 1942  2 Sheets-Sheet 1

Inventor
Arthur E. Benson
By G. J. Kessenich & J. H. Church
Attorney

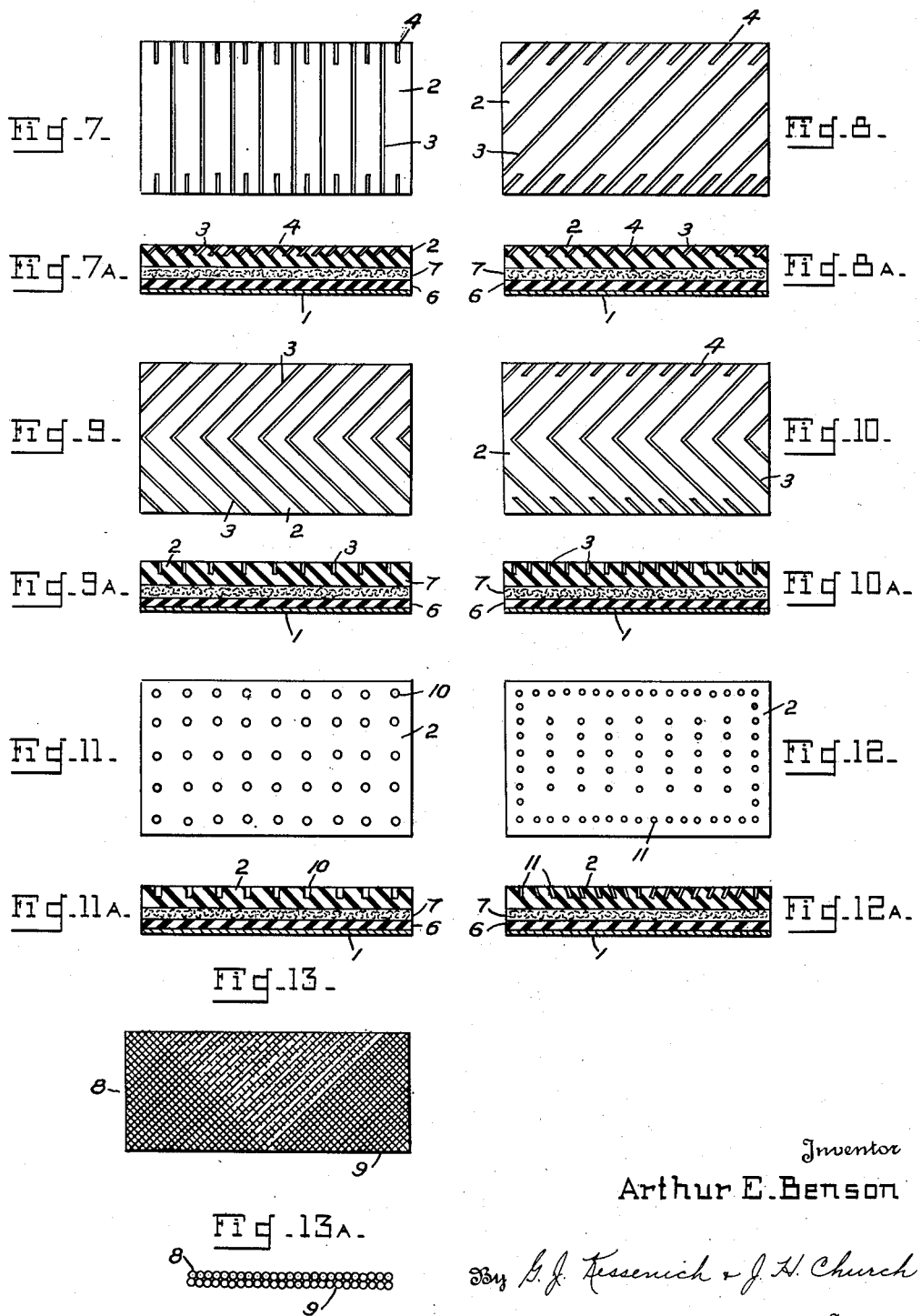

Patented Feb. 13, 1945

2,369,130

UNITED STATES PATENT OFFICE 2,369,130

REINFORCED RUBBER TREAD FOR
TRACK SHOES

Arthur E. Benson, Springfield, Mass.

Application March 3, 1942, Serial No. 433,138

2 Claims. (Cl. 305—10)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to an improved rubber reinforced tread particularly adapted for use on track shoes of vehicles utilizing endless track or "caterpillar" propulsion means.

Considerable difficulty has heretofore been experienced in providing a suitable rubber tread for the track shoes of heavy vehicles such as tractors, tanks, and other track-laying vehicles. It has been found that conventional rubber treads consisting entirely of compounded rubber quickly deteriorated in such application regardless of the excellence of the rubber composition. This deterioration is extremely rapid when the vehicle is operated over a terrain which presents abnormal conditions, such as found in the desert. Such deterioration is believed to be due to the severe deformation produced in the rubber tread by the necessary heavy loading of the vehicle and is aggravated by elevated temperatures and the abrasive action of desert sand. In fact the substitution of steel treads or the reinforcement of the rubber by large inserts has been resorted to. This action of course produces a rigid tread with its attendant disadvantages when operating on an improved road, namely, rapid breakdown of the road surface, higher noise level, and decreased riding comfort.

It is therefore an object of this invention to produce an improved reinforced rubber tread for the track shoes of track-laying vehicles.

It is a further object of this invention to produce a reinforced rubber tread with improved wearing qualities under abnormal conditions without sacrificing any of the desirable qualities of a pure rubber tread.

A particular object of this invention is to produce an improved rubber tread by novel arrangements of abrasive-resistant flexible material interposed in the rubber tread.

The specific nature of the invention as well as other objects and advantages thereof will clearly appear from a description of a preferred embodiment as shown in the accompanying drawings in which:

Figs. 1, 2, 3, 4, 5, 6, 7, 8, 9, 10, 11, and 12 are top views of treads involving various modifications of my invention.

Figs. 1a, 2a, 3a, 4a, 5a, 6a, 7a, 8a, 9a, 10a, 11a, and 12a are vertical sectional views of the respective treads shown in Figs. 1, 2, 3, 4, 5, 6, 7, 8, 9, 10, 11, and 12.

Figs. 13 and 13a are respectively a side view and top of a built up tread insert.

In all figures of the drawings there is shown a conventional metallic track shoe base 1 of a track-laying vehicle. Suitably secured thereto is a rubber tread 2 which constitutes the road engaging portion of the track shoe. It should be understood that the size or shape of the track shoe base or the method of securing the rubber tread to the base is immaterial to the practice of this invention. In Fig. 1 the rubber tread 2 is shown to be secured to the metallic track shoe base by the commonly known "step down bonding" method. This method utilizes a layer 6 of very hard rubber which is immediately bonded to the track shoe base. A layer 7 of relatively soft and flexible crepe rubber is bonded on top of the hard rubber layer 6. The rubber tread 2 is then bonded to the crepe layer 7 and thus secured to the track shoe base 1.

Figure 1A:
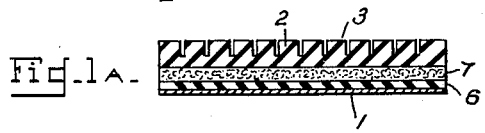
Figure 2A:
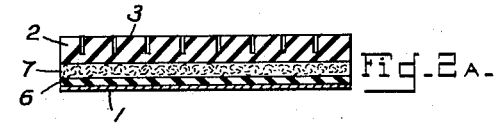

Referring to Figures 1 and 1a the exterior portion of the rubber tread 2 is provided with a series of parallel reinforcing inserts 3 extending entirely across the tread in the direction of motion of the track shoe and vertically inserted into the rubber tread from the road surface thereof. These inserts 3 may comprise various suitable abrasive resistant vertically flexible materials. The properties of cotton are desirable and it is preferable to utilize cotton by constructing the inserts 3 from a layer of cotton tire cords which have been rubber impregnated by the common calender process. If such construction is used, it is important that no cross-threads be provided as such cross-threads decrease the flexibility of the inserts and furthermore are subject to disintegration by shear action between the individual cross-threads and the adjacent portion of the cords. It is preferable to make such an insert by the construction shown in Figures 13 and 13a. In this construction each insert comprises two layers of calendered cord 8 and 9 bonded together in such a manner that the cords in each layer are at a substantial angle with respect to the cords in the other layer.

The inserts 3 are then inserted in the rubber tread 2 and secured thereto by any conventional method. In the case of inserts built up of calendered tire cord the insertion is in such manner as to present the ends of the cords to the road surface of the rubber tread 2.

With an arrangement of such inserts in the rubber tread 2, the resulting reinforced tread is found to have a much greater resistance to wear and abrasion than that of a pure compounded rubber tread. This is believed due to the vertical reinforcement of the tread body by the inserts plus the fact that the tread material is divided into a plurality of independently acting sections which results in a reduction of overall yielding and deformation caused by the heavy loads generally applied to such treads. The hysteresis effect arising from the deformation of the rubber, and hence its damaging heat generation, is thereby substantially reduced. At the same time the inserts are sufficiently flexible in all directions that the resulting reinforced tread retains substantially the same cushioning properties as the pure rubber. The ready yielding of the insert material also insures that no separation between it and the rubber will occur. Furthermore the exposed end sections of the abrasive resistant fibers increase the abrasive resistance of the tread. The material of the inserts is not as important as the arrangement and disposition of the insert material in the rubber tread whereby the insert material can act as a reinforcement to the rubber without eliminating the resilient properties of the resulting tread. Thus while inserts of cotton are preferred, rayon, flexible plastics or even thin flexible metals could be utilized.

Figure 2:
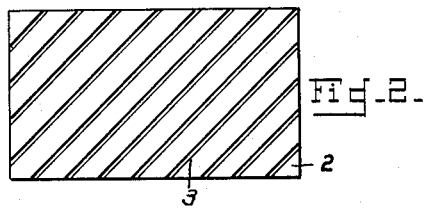
Figure 3:
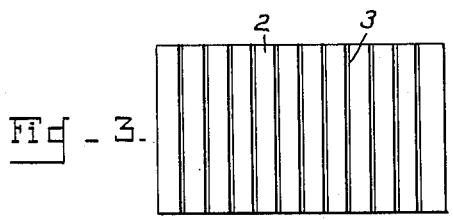
Figure 4:
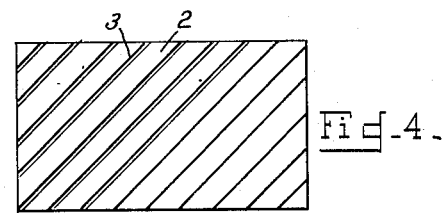
Figure 3A:
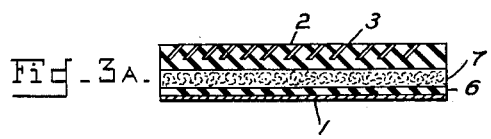
Figure 4A:
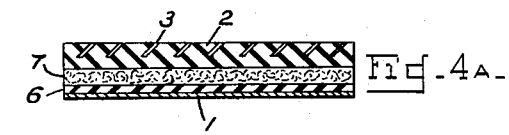
Figure 5:
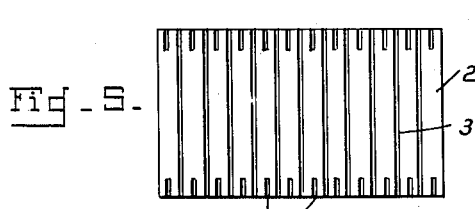
Figure 6:
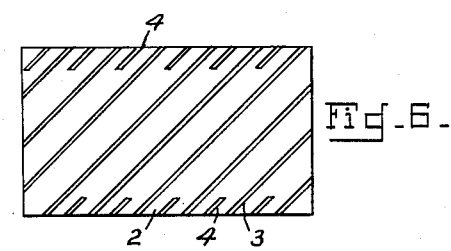
Figure 5A:
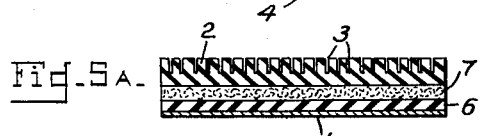
Figure 6A:
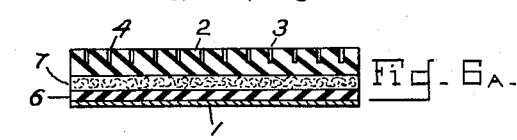

The remaining figures of the drawings illustrate alternative arrangements of the inserts within the rubber of the reinforced tread 2. In all of these arrangements the ends of the filamentary material making up the inserts are presented to the road surface. In Fig. 2 the inserts 3 have the same vertical configuration as in Fig. 1 but are disposed throughout the tread at an angle to its length. In Fig. 3 the inserts are parallel to the length of the tread as in Fig. 1 but extend into the rubber at an angle to the vertical plane. In Fig. 4 the inserts are disposed in the rubber at an angle to both the length of the tread and to the vertical plane.

A still further improved construction is shown in Figs. 5, 6, 7, and 8. The constructions shown in these figures have main inserts 3 disposed in the rubber in the same manner as in Figures 1, 2, 3, and 4 respectively. However, between the main inserts 3 and parallel thereto, small inserts 4 of similar material are provided at the leading and trailing edges on the rubber tread. This arrangement provides still further support at those edges of the tread which are subject to the most rapid deterioration due to wear. It will be obvious that as each track shoe is brought around to road engaging position, the leading edge will for a short period receive the entire force imposed upon that particular shoe. Likewise, when the track shoe is raised from the road surface, the trailing edge will carry all the force imposed upon the entire shoe for a short period. The provision of the small inserts 4 reinforces these leading and trailing edges sufficiently to compensate for the heavy loads thus imposed on these portions of the rubber tread. Further modifications of the insert material 3 are shown in Figs. 9 and 10. Thus these inserts 3 may be disposed in a zig-zag or chevron contour along the length of the rubber tread. As shown in Fig. 10 reinforcing inserts 4 at the leading and trailing edges of the tread may be utilized in combination with the zig-zag arrangement of the main inserts 3.

If it is desired to use synthetic materials comprising linear superpolymers of the polyamide type as reinforcements, such material may be advantageously inserted in the rubber tread in the form of plugs or bristles due to its superior strength and flexibility. This construction is illustrated in Figs. 11 and 12. In Fig. 11 the plugs or bristles 10 are inserted in the rubber tread 2 in a vertical position with the ends of the bristles exposed to the road surface while in Fig. 12 the bristles are disposed in the rubber at a slight angle to the vertical. Edge reinforcement may be secured in either of these arrangements by the provision of additional plugs or bristles 11 along the leading and trailing edges of the rubber tread 2.

In all modifications disclosed, the size of the inserts and the number disposed in each rubber tread should preferably be such that the area of their exposed end surfaces does not exceed 15% of the total area of the rubber tread.

I claim:

1. A traction tread for vehicles of rubber-like material comprising spaced main inlays of fibrous material angularly disposed to the wear surface thereof and extending in the general direction of engagement with the traction surface to be engaged and substantially coextensive with the tread in such direction and auxiliary inlays of shorter length than the main inlays intermediate the same and located at the ends of said tread in the said direction of engagement, all of said inlays constructed to be substantially as flexible as the rubber-like material.

2. A traction tread for vehicles of rubber-like material comprising spaced main inlays of fibrous material extending in the general direction of engagement with the traction surface to be engaged, and auxiliary inlays of shorter lengths than the main inlays intermediate the same and located adjacent the ends of the main inlays, all of said inlays constructed to be substantially as flexible as the rubber-like material.

ARTHUR E. BENSON.